June 9, 1931.  F. H. OWENS  1,809,599

TALKING CARTOON MOTION PICTURE

Filed Jan. 6, 1927   2 Sheets-Sheet 1

INVENTOR
FREEMAN H. OWENS.
BY
Philip S. Hopkins
ATTORNEY

INVENTOR
FREEMAN H. OWENS.
BY
ATTORNEY

Patented June 9, 1931

1,809,599

UNITED STATES PATENT OFFICE

FREEMAN H. OWENS, OF NEW YORK, N. Y.

TALKING CARTOON MOTION PICTURE

Application filed January 6, 1927. Serial No. 159,340.

As is well known in the production of animated cartoons or cartoon motion pictures, the characters are first drawn separately on sheets in the various positions of action and each sheet is photographed individually on motion picture film thus providing a negative from which are made the animated cartoon "movies" common on the cinema screen today.

With the advent of the commercial success of "talking movies" or the recording and reproduction of sound in connection with motion pictures, on photographic film and otherwise, I have now provided a means and method for combining with a cartoon motion picture, words, music or other sound appropriate to the pictures. This is especially adaptable to the making of animated "singing cartoons".

The principal problem affecting such combination lies in the proper synchronism between the sound record and the pictures, and in accurately co-relating the sound record with the cartoon pictures. In other words, the sound record and the pictures must be perfectly synchronized so that the reproduction of the sound will correspond perfectly to the projected pictures.

In the making up of a talking or singing cartoon, it is necessary that the words, music, etc., be first recorded, then the cartoon pictures photographed in accordance with the recorded sound. To reverse this order and first photograph the pictures and then let the artist or actor sing to such projected pictures, offers great difficulties due to the fact that the speed at which the sound is recorded is different from that at which the pictures are made.

Many objects and advantages in details of construction and operation will be apparent as the description proceeds, reference now being had to the figures of the drawings wherein like reference numerals indicate like parts.

In the making up of what I will hereafter call a talking cartoon movie, there are certain sounds to be recorded, photographically or otherwise, for reproduction in connection with certain parts of the picture film corresponding to particular poses, actions or situations assumed by the characters of the animated cartoon. These sounds may be music, a song, spoken words, or perhaps certain noises peculiar to the characters in the picture.

In order that the operator, who is making up photographically the picture film, may know at just what points on the picture film certain sounds should appear so as to synchronize with the characters of the picture film, I provide the following method and apparatus.

Figure 1:
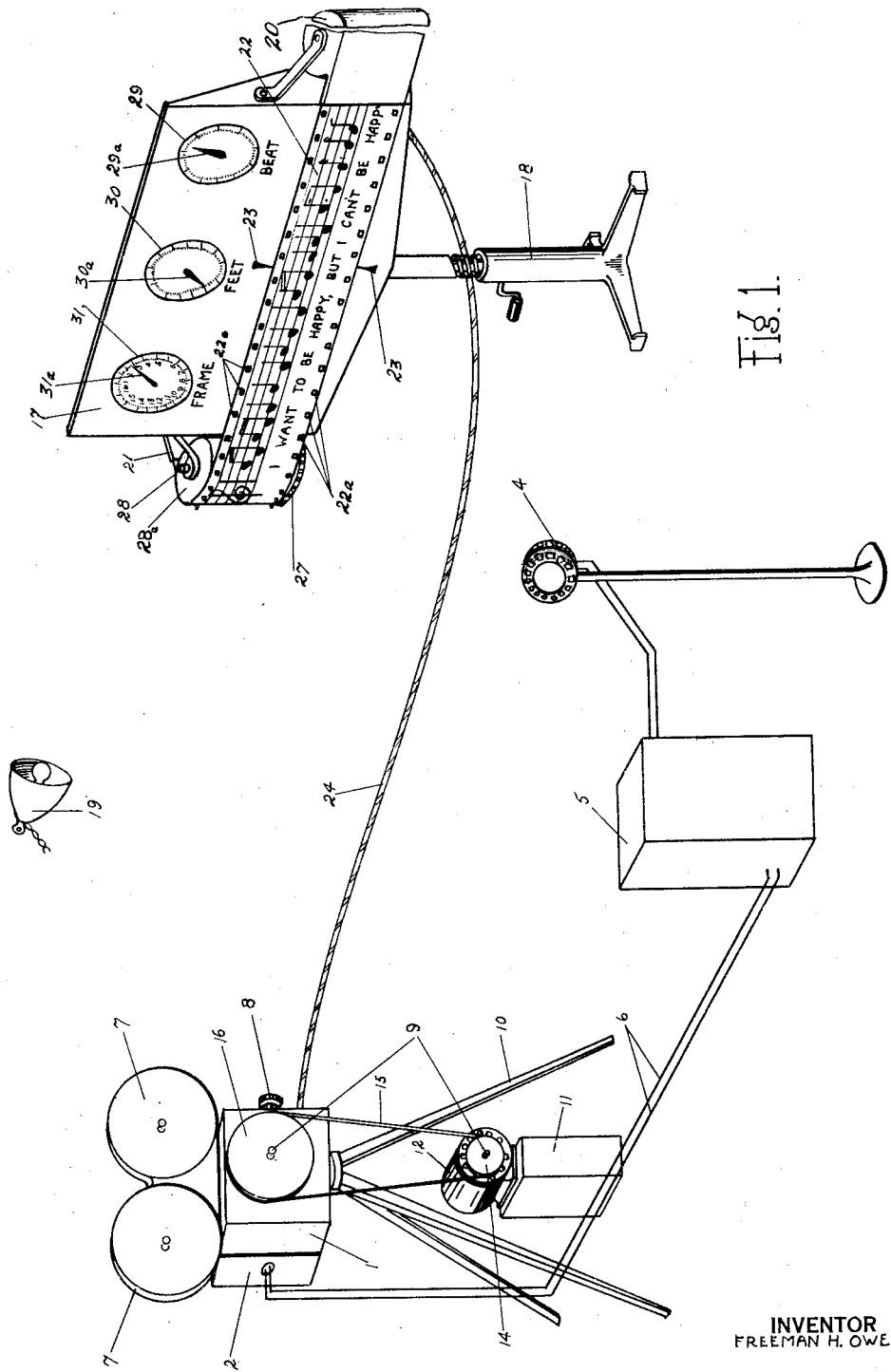
Figure 1 is a semi-diagrammatic view in perspective illustrating a portion of the apparatus and one of the steps of my method.
Figure 2:
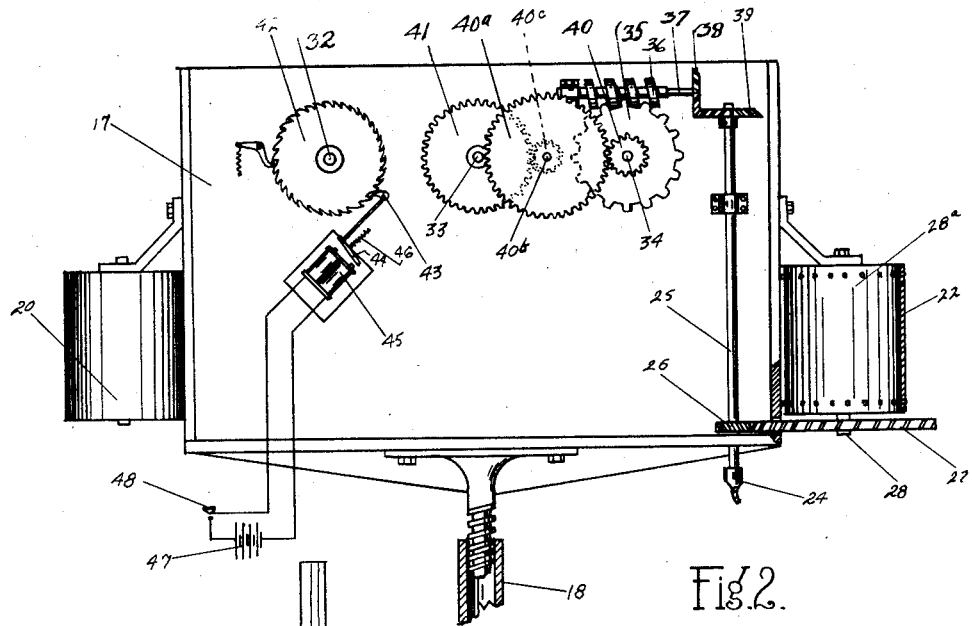
Figure 2 is a detail rear view of the instrument board shown in Figure 1.

Assuming that the scenario and the preliminary drawings of the characters have been determined upon, with the characters in their various positions of action, the next step is to record the sound which will be appropriate to the pictures. I prefer to record this sound photographically so that it may later be printed on the same positive film with the pictures and reproduced therefrom, but it will be understood that such recording may be done in other ways, such as on a phonograph disk. For purpose of illustration, however, I have shown in Figure 1 a motion picture camera 1 and a sound camera 2, both driven by the same driving means. By sound camera, I means an apparatus, the details of which are not necessary to this application and have therefore been omitted, but which includes film reels from which a sensitized film passes in a continuous motion through the camera 2. The sounds are caught by the microphone 4 and amplified by the conventional amplifier 5, from which the electric impulses corresponding to the sound waves pass through the wires 6 to the sound camera 2, where they cause fluctuations of an actinic light, which fluctuations are recorded photographically on the sensitized film through a narrow slit past which the sensitized film moves. The motion pictures camera is of any preferred silent construction including of course the film reels 7, lens 8 and the driving shaft 9 for controlling the mechanism. This apparatus is shown in Figure 1 as supported upon a tripod 10 below which is a support 11 upon which is mounted a suitable motor 12, the shaft 13 of which is provided with a relatively small pulley 14 over which the belt 15 passes upwardly and around a relatively large fly wheel pulley 16 on the shaft 9. Preferably the shaft 9 operates the mechanism of both the motion picture camera and the sound camera thereby producing perfect synchronism of movement of the films in the two cameras. It is understood of course that the recording of the sound is a continuous operation whereas the operation of the picture camera is intermittent. If desired, a single camera specially designed for both recording sound and the taking of pictures may be used for this purpose.

In line with the lens 8 of the motion picture camera, I provide an instrument board 17 adjustably mounted on a standard 18. This instrument board carries certain devices which are to be photographed by the motion picture camera 1, and a light source 19 is provided for suitably illuminating the instrument board for this purpose.

The instrument board 17 is provided at each side edge with housings 20 and 21 containing spools or reels for receiving a movable chart 22 which may contain music or words or other indications of sound appropriate to the cartoon pictures. This strip or chart 22 is perforated at its side edges at as 22a, and is initially wound upon the spool or reel within the housing 20 and is adapted to be drawn from such housing across the front of the instrument board 17 and wound up upon the reel or spool within the housing 21. Indicating marks 23 are provided on the instrument board adjacent the movable chart 22 and past which the chart moves.

In order that the chart 22 may be moved across the instrument board 17 simultaneously and synchronously with the operation of the motion picture camera 1 and the sound camera 2, a flexible shaft 24 is suitably connected at one end to a moving part within the camera 1, preferably the shutter shaft (not shown), and drives at its opposite end a shaft 25 suitably mounted on the back of the instrument board 17. A pinion 26 on this shaft meshes with a gear 27 carried by the shaft 28 of a sprocket 28a, the teeth of which engage in the perforations 22a of the chart 22, whereby upon operation of the camera and consequent rotation of the flexible shaft 24, the chart 22 will be drawn from the housing 20 across the instrument board 17 and wound up within the housing 21 in synchronism with the cameras 1 and 2.

The gear ratio between the camera shaft 24 and the sprocket 28a is such that for every foot of film wound through the camera, the sprocket 28a will rotate twice, there being a 1 to 8 gear ratio between the pinion 26 and the gear 27. This ratio brings the movement of the chart 22 to perfect synchronism of movement with the film in the cameras, so that the sound record on the film in camera 2 will correspond exactly in footage with the picture film in camera 1.

The words or music, or both, which are to be recorded are thus in plain view, and an artist or speaker standing by the microphone can follow the chart as it passes the indicating marks 23 and the sound will be recorded on the film in the sound camera simultaneously with the taking of the motion pictures by the camera 1 of the chart on the instrument board 17. The music on the chart is of course so arranged that it is sung or played at the correct tempo, corresponding to the speed of the sound recording camera 2.

Also on the instrument board 17 in line with the motion picture camera 1 are a series of dials 29, 30 and 31 graduated in a manner to be described and over which dials pointers 29a, 30a, and 31a respectively move. These pointers are mounted on shafts 32, 33 and 34 respectively, extending through to the rear of the instrument board 17. Mounted upon the shaft 34 is a worm gear 35 with 16 teeth, meshing with a worm 36 on the shaft 37, one end of which is provided with a miter gear 38 meshing with a similar gear 39 carried at the upper end of the shaft 25. The ratio of the worm gears 35 and 36 is such that at a given rate of speed at which the flexible shaft 24 is rotated by the camera 1, the pointer 31a will move completely around the dial 31 once for every foot of film wound through the camera, said dial being graduated into sixteen divisions representing the sixteen frames to each foot of film.

Also carried on the shaft 34 on which the gear 35 is secured, is a pinion 40 meshing with a relatively large gear 40a on a stub shaft 40b, which shaft also carries a pinion 40c meshing with the gear 41 mounted on the shaft 33. This reduction gearing is provided for the purpose of causing relatively slow movement of the shaft 33 on which is mounted the pointer 30a moving over the dial 30. The ratio of this reduction gearing is such that said pointer 30a will complete one movement around the dial 30 for every predetermined number of feet of film passing through the camera 1, for instance every 400 feet of film, said dial being graduated in feet.

Obviously then, the pictures taken upon the film in the motion picture camera 1 will be pictures of the everchanging chart and dials or pointers on the instrument board and will show on the finished film the exact relation between the sound chart, the number of feet of film, and the exact frame of any given foot; and as the sound record is recorded simultaneously upon the film in the sound camera 2, it will be obvious that this record will synchronize with the picture taken of the instrument board on the film in camera 1.

It will be understood of course that the chart 22 is prepared in advance and suitably marked with reference to the subject matter of the picture to be made. Furthermore, it may be desirable at certain times to eliminate from the images of the instrument board, the music chart. This may obviously be done by masking it from the camera and leaving only the dials visible. It may be desired also to substitute for the chart on the photographs made in camera 1 of the instrument board, images of a person, an animal or other characters. In such event, the chart 22 is masked and the characters desired are placed in line with the camera 1 in such position that they may be photographed together with the dials on the instrument board.

On the shaft 32 carrying the pointer 29a, and at the rear of the instrument board, there is mounted a toothed ratchet 42 with which engages a pawl 43 carried by the armature 44 of an electromagnet 45 suitably mounted adjacent the sprocket 42. A spring 46 normally pulls the armature 44 out of engagement with the magnet 45. Included in the circuit of the magnet 45 is a battery 47 and a make and break member 48 which may be located in any suitable position for operation to make and break the circuit at each beat or measure of the music which at the time is being recorded. It will be understood, of course, that the closing of the circuit causes the magnet 46 to draw the armature 44 toward it thus rotating the sprocket 42 a distance of one tooth through the means of the pawl 43. This of course rotates the shaft 32 and moves the pointer 29a over the dial 29 which may be suitably graduated.

Thus, there may be also included in the pictures taken of the instrument board, the exact beat or tempo of the music being recorded.

By the means just described, it will be seen that simultaneously with the recording of the sound appropriate to the pictures to be photographed, I now have on the film in the motion picture camera 1 a record, which of course is visual when the film is developed, showing the exact frame and footage, and the beat of the words and music, at which each sound is recorded, as well as possibly the pictures of persons, animals, or other objects which may be substituted for the chart 22, as above described. With this film negative, or a positive print therefrom, the cartoonist is now enabled to match correctly, make the action or poses of the characters on his drawings match the sound chart characters and to then photograph his drawings on another film in his "cartoon" camera. In other words, he is able to match his cartoon exposures as to footage, frames, etc. in his camera, with the sound record which has been made synchronously with the pictures of the instrument board.

Figure 3:
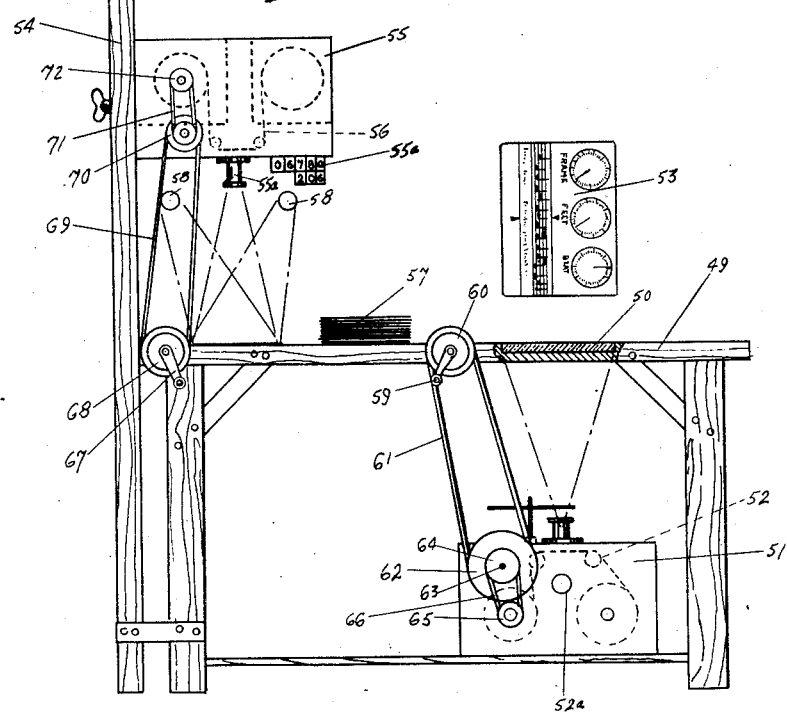
Figure 3 is a side elevation of a combined apparatus used in my invention.

In Figure 3, I have illustrated the apparatus which may be used by the cartoonist in so arranging his motion pictures of the cartoon drawings. In this figure, a suitable work table 49 is provided, at one point of which is mounted a screen 50 preferably of ground glass, beneath which is mounted any suitable projection apparatus 51 through which may be wound frame by frame the film 52 bearing the visual images of the instrument board taken in the manner above described. The images from this film are projected up to the screen 50 by means of the lamp 52a, where they may be viewed by the cartoonist. 53 indicates a typical image thus projected.

At one end of the table 49 is a supporting standard 54 carrying near its upper end and above the table 49 a motion picture camera 55 carrying a sensitized motion picture film 56, adapted to photograph the images of the characters on the cartoon sheets or drawings 57 when they are placed under the lens 55a and illuminated by the lamps 58. The camera 55 is also preferably provided with a conventional footage 55a, preferably indicating both the footage of the film 56 as it passes through the camera, and the frames of each foot.

Means are provided for winding the film 52 through the projector 51 comprising a crank 59 adapted to rotate a pulley 60 over which passes an endless belt 61, also passing over a pulley 62 mounted on shaft 63 which shaft also carries a pulley 64 between which and the pulley 65 on the shaft of the take up reel in the projector, passes another endless belt 66. By this means the cartoonist photographer may project each frame of the film 52 taken of the instrument board, to the screen 50, as he desires.

Similar means are provided for operating the camera 55 in which the exposures of the cartoon drawings are being made. This means consists of the crank 67, pulley 68, belt 69, pulley 70, belt 71 and pulley 72 on the shaft of the take up reel of camera 55.

It is obvious therefore that by the method above described the cartoonist can by reference to the images on the chart film 52, make the exposures, one by one, in the camera 55, of the cartoon drawings, in exact co-relation with said chart film, which latter having been made synchronously with the sound record, results in the "cartoon movie" made on film 56 being also synchronized with said sound. For instance, if the cartoonist sees on the projected chart image, that at the two hundred and sixth foot of film, and at frame seven of that foot, the first "beat" of a song is begun, he can place the proper drawing of the cartoon character, showing a pose corresponding with the beginning of such song, under the camera 55, and, with the footage counter 55a of said camera showing a similar footage and frame designation, he is certain that in photographing such drawing at exactly this point, it will correspond perfectly with the sound record, made synchronously with said film 52.

When the cartoon movie film 56 has been completed and the negative developed in the usual manner, this negative together with the negative of the sound record which was photographed in the camera 2, are printed together on a single positive film. This positive film then contains the cartoon movie and the sound appropriate thereto in perfect synchronism and may now be projected and the sound reproduced in any well known manner.

I have described but one form and arrangement of my invention but it will be understood that many changes may be made without departing from the spirit thereof. I do not limit myself therefore to that shown other than by the appended claims.

I claim:—

1. The method of synchronizing sound and motion pictures comprising the steps of, moving a sound chart, simultaneously photographing said moving sound chart and recording sound made in accordance with said chart, observing successive photographs of said chart, and then photographing cartoon pictures in corresponding relation to the successive photographs of said sound chart.

2. The method of synchronizing sound and motion pictures comprising the steps of, preparing a sound chart, photographing successive portions of said chart and simultaneously recording sound made in accordance with said chart, said sound being of a speed corresponding to the speed of said sound recording, preparing cartoon pictures corresponding to said sound chart, and photographing said cartoon pictures in accordance with the photographs of said chart.

3. The method of synchronizing sound and motion pictures comprising the steps of, recording sound and simultaneously photographing successive portions of a sound chart having changeable indicia thereon, changing said indicia synchronously with the recording of said sound, drawing cartoon pictures corresponding to the recorded sound, and photographing individual cartoon pictures appropriate to said sound in accordance with the photographs of said sound chart.

4. The method of synchronizing sound and motion pictures comprising the steps of simultaneously recording the sound photographically and photographing a footage chart and a sound record strip driven synchronously with the sound recorder, observing successive photographs of said footage chart and said sound record strip, preparing cartoon pictures in accordance with said chart and said sound record strip, and photographing individual cartoon pictures in corresponding relation to said footage chart.

5. The method of synchronizing sound and motion pictures comprising the steps of simultaneously recording the sound photographically and photographing successive indications of a footage indicator and successive portions of a sound chart driven synchronously with the sound recorder, observing successive photographs of said footage indicator and sound chart, preparing individual cartoon pictures corresponding to said photographs, and photographing the individual cartoon pictures in corresponding relation to said sound chart.

6. The method of synchronizing sound and motion pictures comprising the steps of simultaneously recording the sound photographically and photographing successive indications of a footage indicator, and successive portions of a sound and tempo chart driven synchronously with the sound recorder, observing successive photographs of said chart and indicator, drawing individual cartoon pictures appropriate to said chart and indicator, and photographing the cartoon pictures in corresponding relation to said chart and indicator.

7. The method of synchronizing sound and motion pictures comprising the steps of, simultaneously and photographically recording sound, successive portions of a sound chart and the footage of said sound record, observing successive photographs of said sound chart and footage record, drawing cartoon pictures corresponding thereto, and photographing said cartoon pictures in sequence according to the progressive order of said footage record.

8. The method of synchronizing sound and motion pictures comprising the steps of simultaneously and synchronously making a sound record photographically and a visual record showing a sound chart of the sound recorded and the footage of said sound record, observing successive portions of said visual record preparing pictures matching the said portions and photographing successive pictures thus prepared in corresponding relation to the footage indication and sound chart of said visual record.

9. In combination, a motion picture camera and a sound recording device associated therewith, a sound chart in position to be photographed by said camera and mounted for movement in front thereof, and means for simultaneously actuating said camera, sound recording device and chart, said chart bearing changeable indicia pertaining to the recording of sound by said recording device, said actuating means being adapted to change said indicia synchronously with the operation of said sound recording device.

10. In combination with a motion picture camera, a sound recording device associated therewith, a sound chart bearing a visual sound record of the sound being recorded and indicating devices mounted in front of said camera in position to be photographed by said camera, and means for simultaneously and synchronously actuating and driving said camera recording device, chart and indicating devices whereby sound may be recorded and a visual record made of successive portions of said chart and indicating devices synchronously therewith.

11. In combination with a motion picture camera, a sound recording device associated therewith, a sound chart bearing a visual sound guide of the sound being recorded and indicating devices mounted in front of said camera in position to be photographed by said camera, and means for simultaneously and synchronously actuating said camera, recording device, chart and indicating devices whereby sound may be recorded and a visual record made of said chart and indicating devices synchronously therewith, said chart and indicating devices having reference to the progression of the sound recorded by said recording device.

12. In combination, a motion picture camera, a photographic sound recording device, and an instrument board mounted in front of said camera in position to be photographed by said camera, indicating devices on said board for indicating the footage and frame of the film of said picture camera and the beat of the sound being recorded by the recording device, said indicating devices being operative synchronously therewith, a second indicating device on said board referring to the tempo of the sound to be recorded and operative independently of said recording device, a sound chart on said board in view of the source of the sound to be recorded, and means for simultaneously operating said camera and recording device synchronously with the operation of said indicating devices.

13. In combination, a motion picture camera and a sound recording device, a perforated sound chart in position in front of said camera to be photographed by said camera, said chart referring to the condition of operation of said recording device, a single means for actuating said camera and said sound recording device, and means connecting said camera and chart whereby the latter is operable synchronously with the sound recording device.

14. In apparatus for facilitating the synchronization of the operation of motion pictures and sound records, an instrument panel, instruments for measuring film footage and indicating the frame of a film and the beat of music mounted upon said panel, a strip for displaying a sound guide, reels for winding and unwinding said strip mounted upon said panel, and means associated with a motion picture camera and connected to one of said reels for actuating the sound guide displaying strip simultaneously and synchronously with the operation of said motion picture camera.

15. In apparatus for synchronizing the operation of sound records and motion pictures, an instrument board, instruments for measuring film footage and indicating the frame of a film and the beat of music mounted upon said board, a strip for displaying a sound guide, and reels mounted upon said instrument board for winding and unwinding said strip.

16. In apparatus for facilitating the synchronizing of the operation of sound records and motion pictures, an instrument board, instruments for measuring film footage and indicating the frame of a film and the beat of music mounted upon said board, a strip for displaying a sound guide, reels mounted upon said instrument board for winding and unwinding said strip and driving means associated with one of said reels.

17. The apparatus substantially as set forth comprising, a motion picture camera, a sound recording device, means for driving said motion picture camera, a sound chart strip bearing a sound guide to the sound recorded by said sound recording device, reels for winding and unwinding said chart strip, and a flexible member associated with one of said reels and actuated by said picture camera driving means for moving said sound chart strip, the motion picture camera being operated simultaneously with the recording of the sound and the moving of said sound chart strip, the motion picture camera being operated to photograph the moving sound chart.

18. In apparatus of the class described the combination of a motion picture camera, a sound recording device, means for driving said motion picture camera, a sound chart strip bearing a sound guide to the sound recorded by said sound recording device, reels for winding and unwinding said chart strip, a flexible member associated with one of said reels and actuated by said picture camera driving means for moving said sound chart strip, the motion picture camera being operated to photograph the moving sound chart.

19. The method of making synchronously related sound records and motion pictures comprising the steps of, recording sound, making an index record in synchronism therewith and appropriate thereto, making a series of pictures appropriate to said sound using said index record as a guide, and photographing said pictures in sequence according to said index record.

20. The method of making motion pictures to accompany previously recorded sound comprising the steps of, exhibiting indicia and corresponding length marks made in synchronism with a sound record and appropriate thereto, making a series of pictures apropriate thereto, making a series of pictures appropriate to said sound using said indicia as a guide, and photographing said pictures in sequence according to said length marks.

FREEMAN H. OWENS.